(12) United States Patent
Hwang et al.

(10) Patent No.: US 8,214,000 B2
(45) Date of Patent: Jul. 3, 2012

(54) LOCKING DEVICE FOR INTERNAL BATTERY PACK COVER OF MOBILE PHONE

(75) Inventors: Ki-Ung Hwang, Anyang-si (KR); Hong-Bae Kim, Yongin-si (KR); Sang-Hyuck Jung, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1118 days.

(21) Appl. No.: 11/867,417

(22) Filed: Oct. 4, 2007

(65) Prior Publication Data

US 2008/0096617 A1    Apr. 24, 2008

(30) Foreign Application Priority Data

Oct. 19, 2006    (KR) .................. 10-2006-0101849

(51) Int. Cl.
*H04M 1/00* (2006.01)
*H05K 5/00* (2006.01)
*H05K 7/00* (2006.01)
*E05C 19/02* (2006.01)
*E05C 1/02* (2006.01)

(52) U.S. Cl. ............... 455/575.1; 455/575.3; 455/575.4; 361/679.01; 361/679.56; 292/14; 292/137

(58) Field of Classification Search .................. 455/425, 455/550.1, 575.1, 575.3, 575.4, 575.7; 361/679.26, 361/679.27, 679.3, 679.55, 679.56, 679.01; 379/330, 428.01, 433.01–433.13, 440; 348/373, 348/375, 376; 292/14, 137

See application file for complete search history.

(56) References Cited

U.S. PATENT DOCUMENTS

| 7,197,344 B2 * | 3/2007 | Ahn et al. .................. 455/575.1 |
| 7,484,266 B1 * | 2/2009 | Yang ................................. 16/54 |
| 7,811,698 B2 * | 10/2010 | Tu et al. .......................... 429/98 |
| 2006/0141344 A1 * | 6/2006 | Chen et al. ...................... 429/97 |
| 2007/0169523 A1 * | 7/2007 | Lu ..................................... 70/58 |
| 2011/0067211 A1 * | 3/2011 | Huber et al. ................. 24/712.1 |

FOREIGN PATENT DOCUMENTS

| KR | 1020050000236 | 1/2005 |
| KR | 1020050022114 | 3/2005 |
| KR | 1020050027492 | 3/2005 |
| KR | 1020060100891 | 9/2006 |

* cited by examiner

Primary Examiner — Wesley Kim
(74) Attorney, Agent, or Firm — The Farrell Law Firm, P.C.

(57) ABSTRACT

Provided is a locking device for an internal battery pack cover of a mobile phone, which is mounted on a lower case frame of a main body of the mobile phone, and which includes a locking member formed on the lower case frame; and a locking module coupled to the cover and rotating around a hinge axis with a sliding movement of a button unit to be mounted within or released from the lock member, thereby causing the cover to be coupled to or detached from the main body.

12 Claims, 10 Drawing Sheets

LOCKING DEVICE FOR INTERNAL BATTERY PACK COVER OF MOBILE PHONE

PRIORITY

This application claims priority under 35 U.S.C. §119 to an application entitled "Locking Device For Internal Battery Pack Cover of Mobile Phone" filed in the Korean Intellectual Property Office on Oct. 19, 2006 and assigned Serial No. 2006-101849, the entire contents of which are incorporated herein by reference.

BACKGROUND OF THE INVENTION

1. Field of the Invention

The present invention relates generally to a locking device for an internal battery pack cover of a mobile phone, and in particular, to a locking device for an internal battery pack cover of a mobile phone, which can easily detach the cover from a main body of the mobile phone by a sliding movement of a button unit provided on the cover and the resulting rotation of lockers.

2. Description of the Related Art

Figure 1:
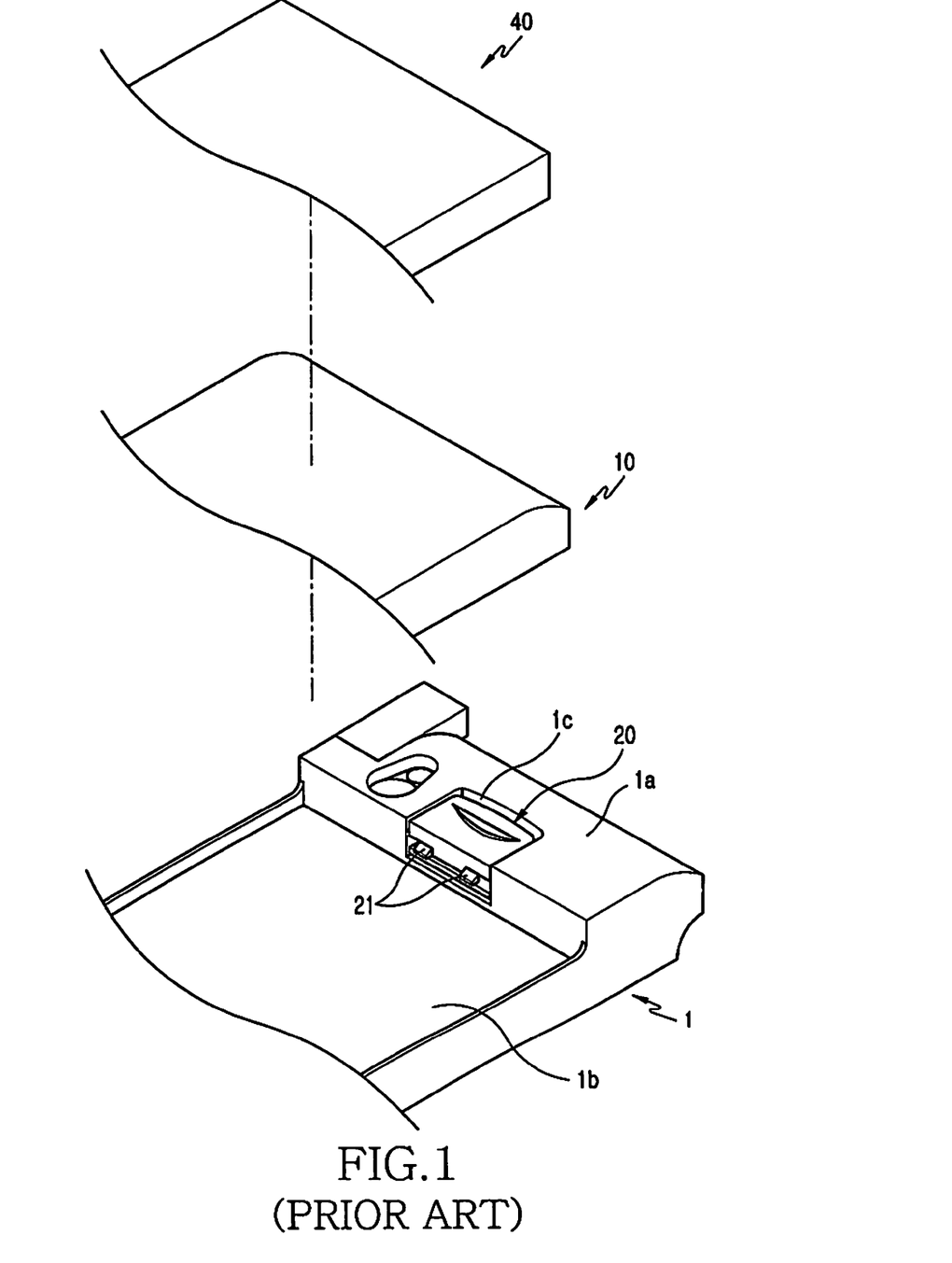
FIG. 1 is a perspective view of a conventional locking device for an internal battery pack cover of a mobile phone.

Generally, a mobile phone includes an internal battery pack 10 (as shown in FIG. 1) as a power supply source. The internal battery pack 10 is mounted and electrically connected to the rear side of a main body 1 and covered by a cover 40, which is detachably mounted onto the rear side of the main body 1 by a locking means 20 provided on the rear side of the main body 1.

A conventional method of mounting the cover 40 of the internal battery pack 10 is to slidingly mount the cover 40 along a guide rib provided on the rear side of the main body 1. Another conventional method of mounting the cover 40 of the internal battery pack 10 is to mount the cover 40 onto the rear side of the main body 1 by locking hooks formed at the lower end of the cover 40 into slots formed on the main body 1 and pressing down a locking means formed on the top end of the cover 40.

FIG. 1 illustrates a conventional locking device for an internal battery pack cover of a mobile phone. The conventional locking device electrically connects the battery pack 10 to the rear side of the main body 1 which includes a lower case frame 1a.

The lower case frame 1a has a battery-receiving compartment 1b on the rear side thereof. A connection terminal (not shown) is protrudingly provided at the lower end of the compartment 1b. Also, a mount section 1c is provided at the upper end of the compartment 1b. A locking means 20 for locking the cover 40 of the battery pack 10 is formed on the mount section 1c.

Figure 2:
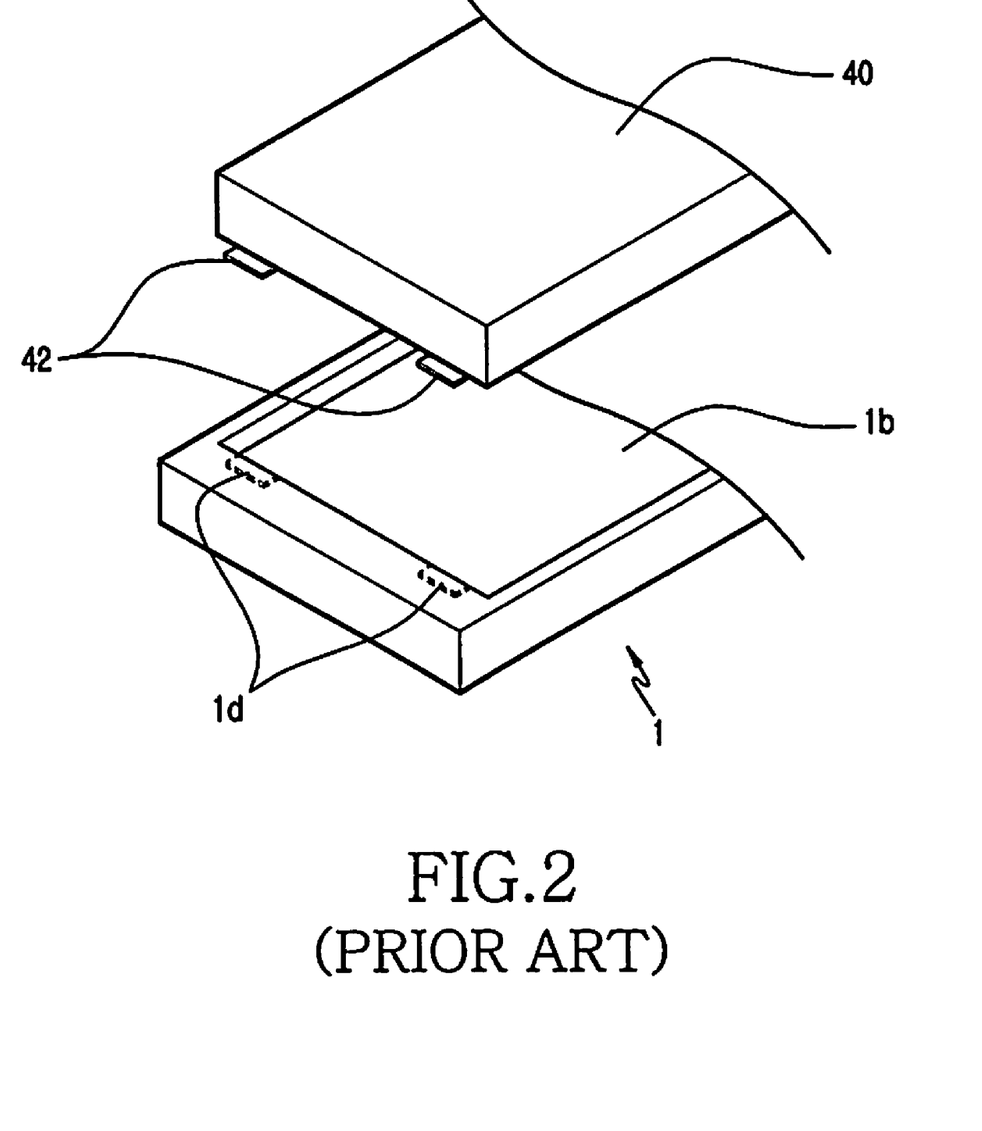
FIG. 2 is a partial perspective view of a conventional locking device for an internal battery pack cover of a mobile phone.

Referring to FIG. 2, the cover 40 of the internal battery pack 10 includes a pair of hooks 42 formed at the lower end thereof and a lock groove 41 formed at the upper end thereof. The cover 40 can be secured to the rear side of the main body 1 by inserting the hooks 42 into hook slots 1d formed on the main body 1 and then pressing down the cover 40 to engage the locking means 20 into the lock groove 41.

Figure 3:
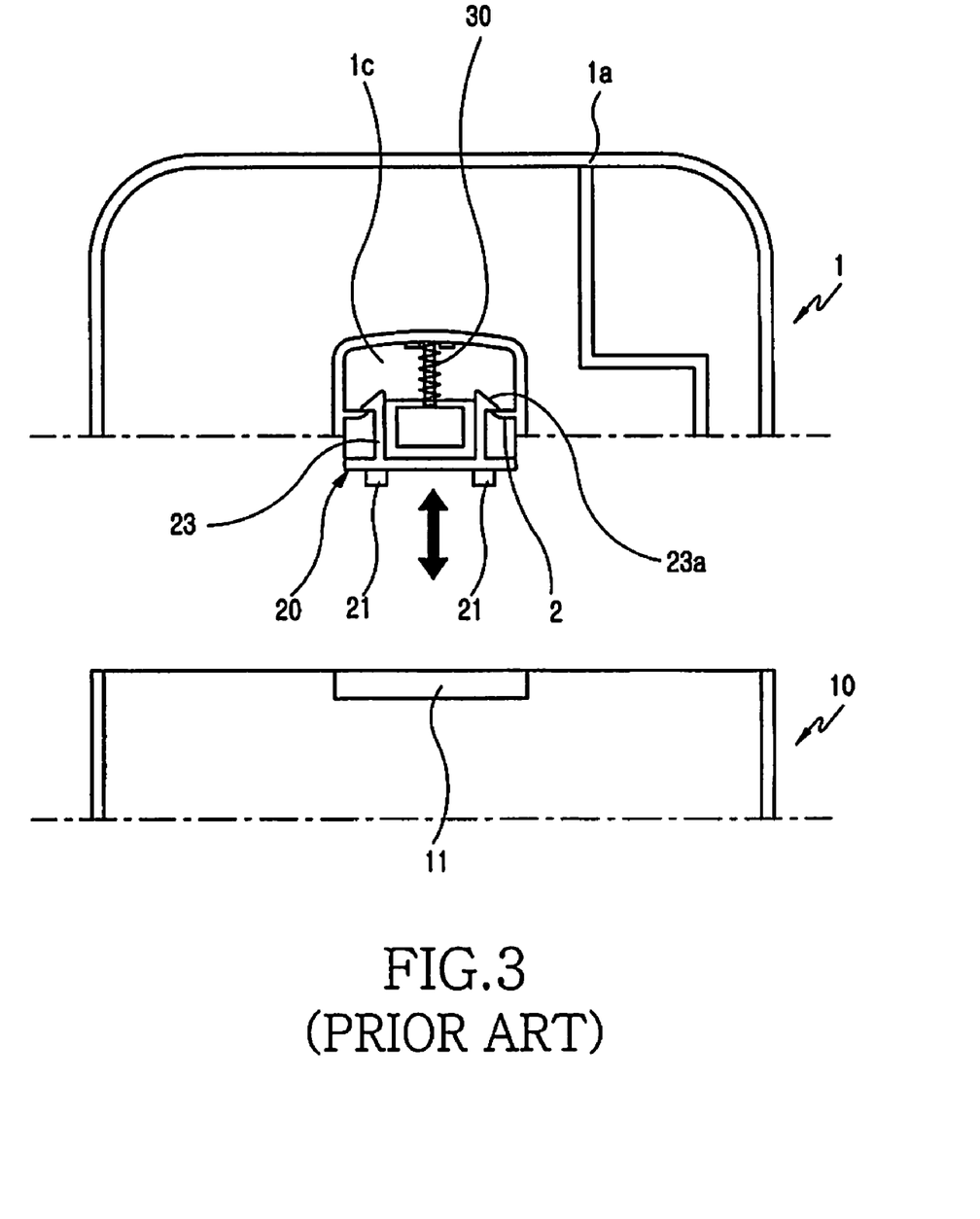
FIG. 3 is a partial cross-sectional view of a conventional locking device for an internal battery pack cover of a mobile phone.

FIG. 3 is a cross-sectional view of a conventional locking device for an internal battery pack cover of a mobile phone. In order to detach the cover 40 of the internal battery pack 10 from the main body 1, the locking means 20 should be pulled backwardly. A pair of locks 21 formed on the lower end of the locking means 20 are also pulled backwardly and withdrawn from the lock groove 41 of the cover 40. Thus, the cover 40 can be separated from the main body 1.

The mount section 1c has a moving space sufficient to allow a sliding movement of the locks 21 in a horizontal direction.

As illustrated in FIG. 3, at least one guide rib 23 is formed on the lower case frame 1a of the main body 1.

The guide rib 23 has a hook portion 23a at the upper end thereof. The hook portion 23a is hooked on a stopper 2 formed on the lower case frame 1a, which prevents the locks 21 from being released out during the sliding movement in a horizontal direction. A spring 30 is mounted in the mount section 1c, as an elastic means for generating an elastic force against the locks 21. While one end of the spring 30 is supported by the lower case frame 1a, the other end presses the locks 21.

As described above, the conventional locking device provides a sufficient space to allow the locks to be slidingly movable within the mount section in a horizontal direction, which may increase the size of the mobile phone and deteriorate the appearance of the mobile phone.

Once the hooks formed at the lower end of the cover are secured into the hook slots formed on the main body of the mobile phone, they will not be smoothly taken out from the hook slots, thereby making it difficult to remove the cover from the main body.

In addition, the conventional locking device has a complicated structure due to the space provided for a sliding movement of the locks.

SUMMARY OF THE INVENTION

Accordingly, the present invention has been made to solve the above-mentioned problems occurring in the conventional art, and an object of the present invention is to provide a locking device for an internal battery pack cover of a mobile phone, which can easily detach the cover from a main body of the mobile phone by a sliding movement of a button unit provided on the cover and the resulting rotation of rockers.

Another object of the present invention is to provide a locking device for an internal battery pack cover of a mobile phone, which can reduce the space required for mounting a conventional locking device to further support the trend towards slim and small designs as well as to improve the appearance of the mobile phone.

In order to accomplish the above objects of the present invention, there is provided a locking device for an internal battery pack cover of a mobile phone, which is mounted on a lower case frame of a main body of the mobile phone, and which includes a locking member formed on the lower case frame; and a locking module coupled to the cover and rotating around a hinge axis with a sliding movement of a button unit to be mounted within or released from the locking member, thereby causing the cover to be coupled to or detached from the main body.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the drawings, the same element, although depicted in different drawings, is designated by the same reference numeral or character. Also, in the following description of the present invention, a detailed description of known functions and configurations incorporated herein will be omitted when it may make the subject matter of the present invention unclear.

Figure 4:
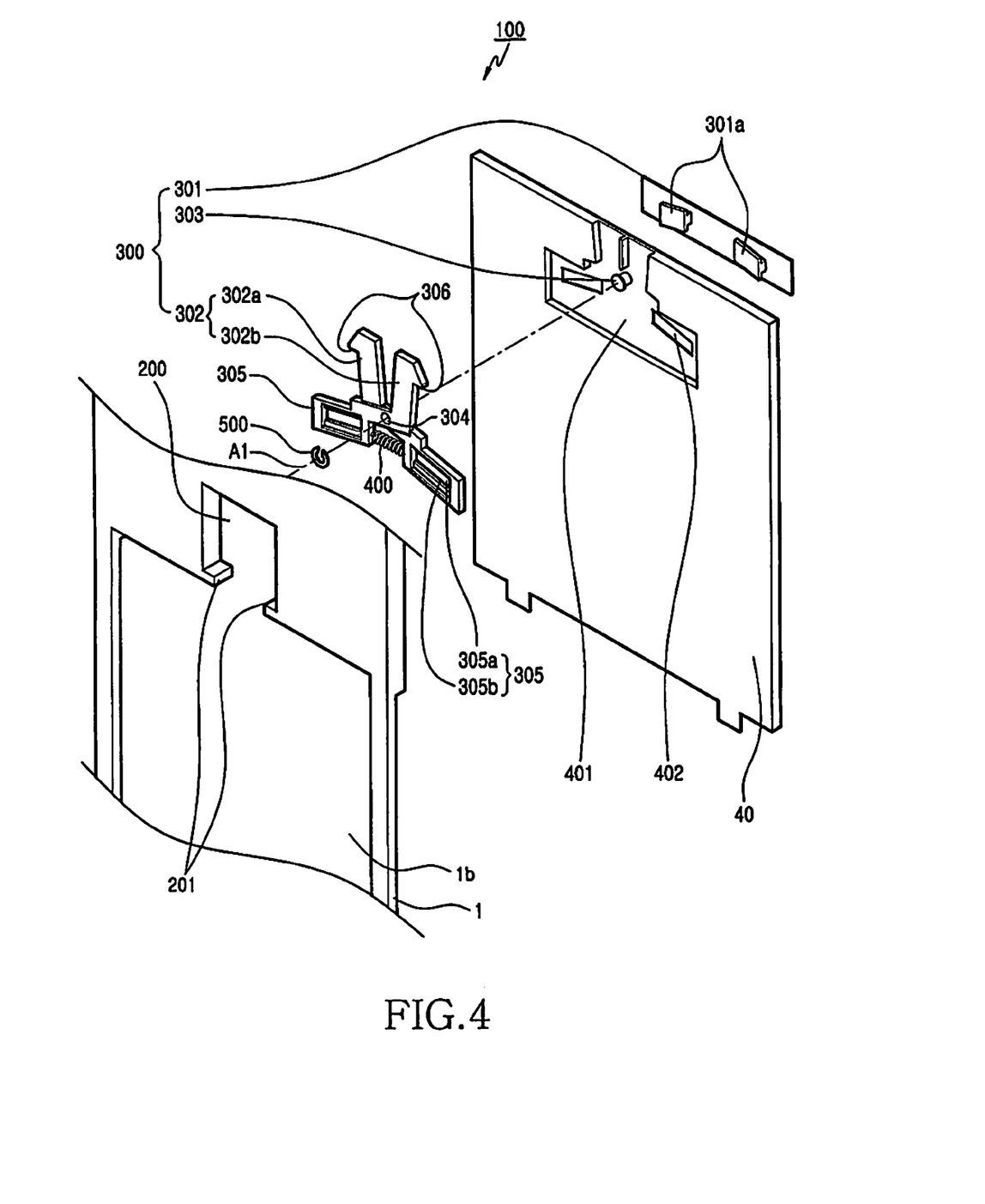
FIG. 4 is an exploded perspective view of a locking device for an internal battery pack cover of a mobile phone according to the present invention.
Figure 5:
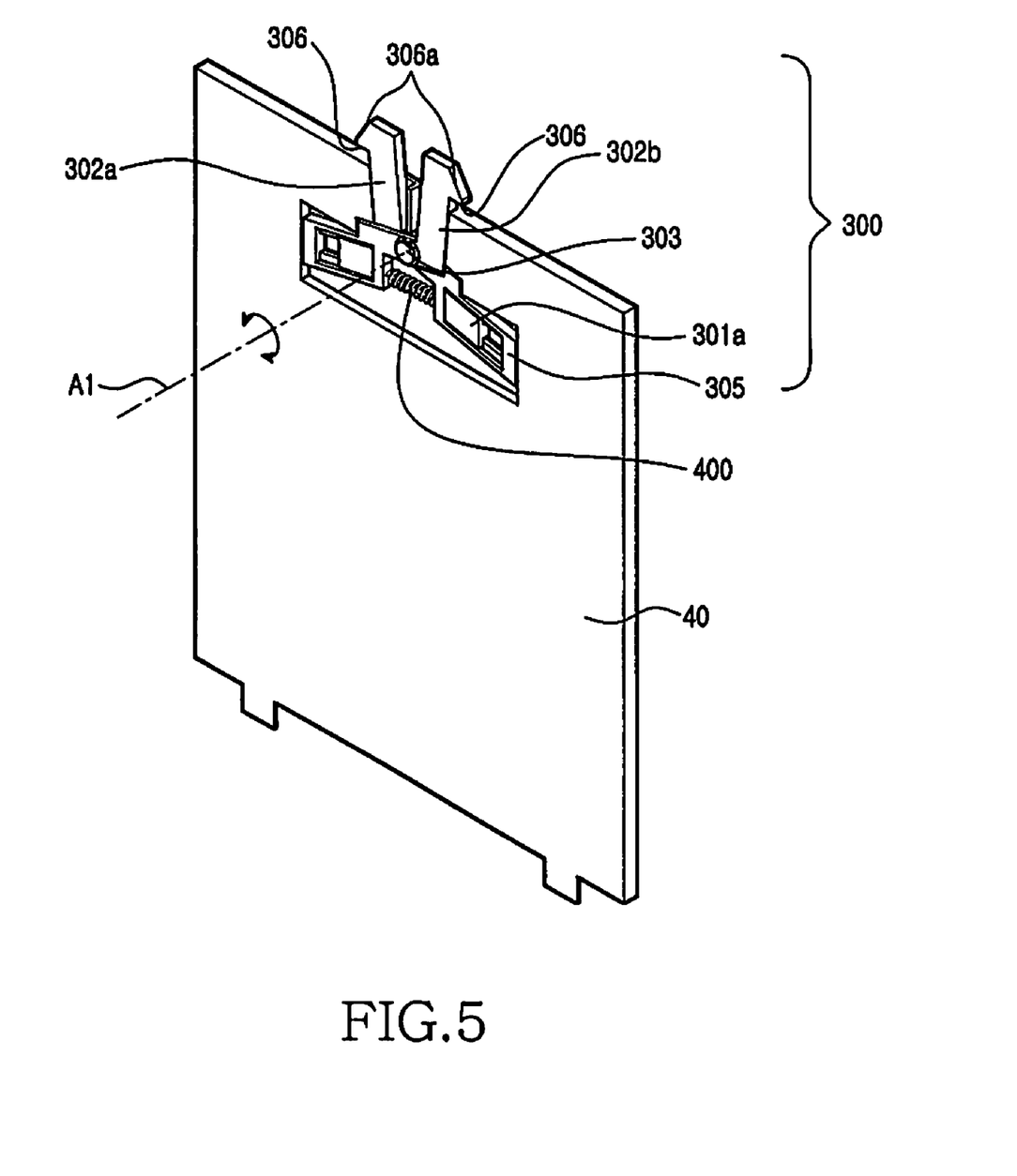
FIG. 5 is a perspective view of a locking device coupled to an internal battery pack cover of a mobile phone according to the present invention.

Referring to FIGS. 4 and 5, a locking device 100 according to the present invention includes a locking member 200 and a locking module 300. The locking member 200 is formed on a lower case frame 1b of a main body 1 of the mobile phone. The locking module 300 includes first and second locks 302a and 302b which can be inserted into or released from the locking member 200. The locking module 300 is mounted on a cover 40 of a battery pack 10. The first and second locks 302a and 302b rotate along a hinge axis A1 with a sliding movement of a button unit 301 to be inserted into or released from the locking member 200. Accordingly, a cover 40 of a battery pack 10 can be secured into or detached from the main body 1.

Figure 8:
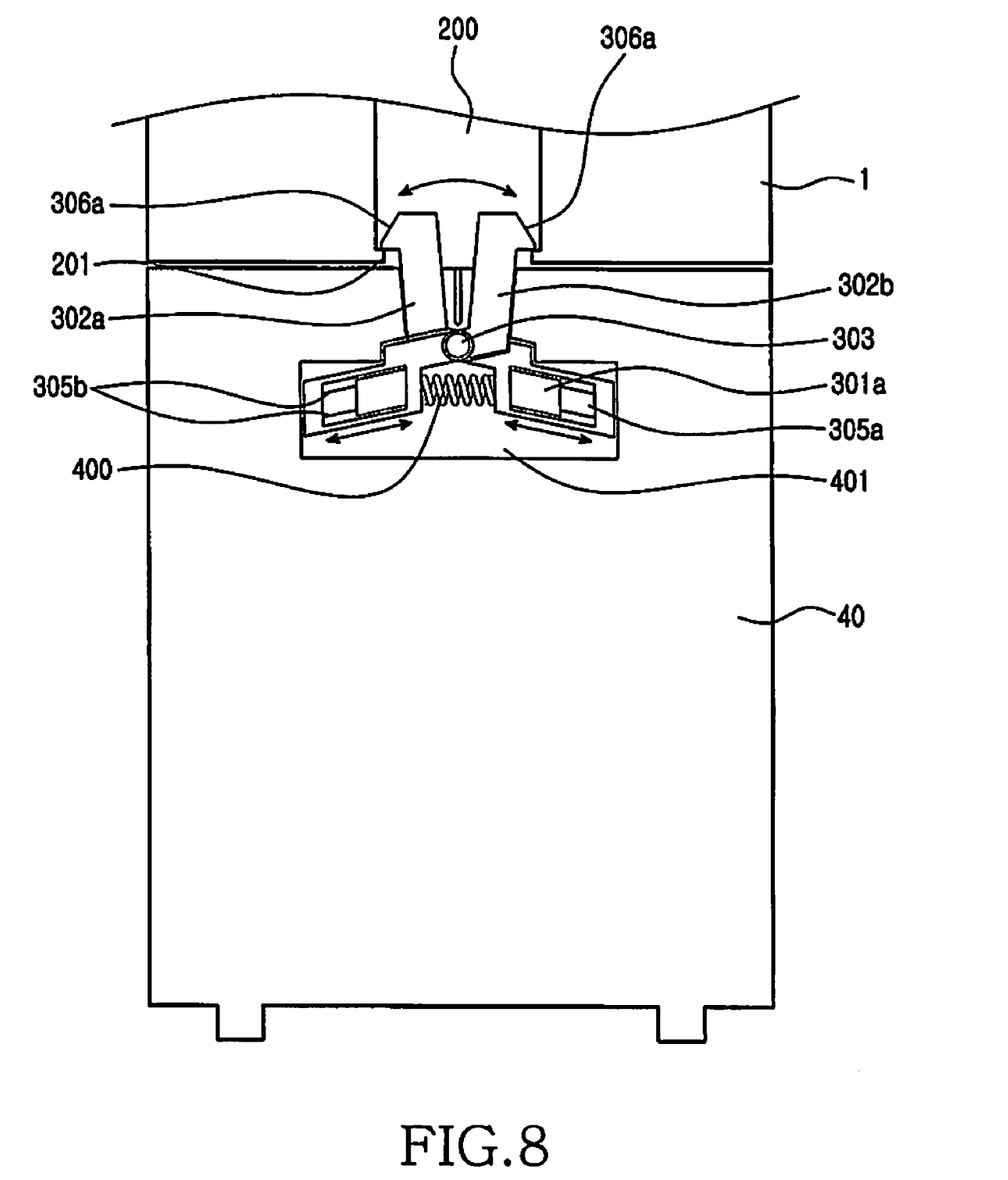
FIG. 8 is a rear view of an internal battery pack cover of a mobile phone with a locking device coupled thereto according to the present invention.

Referring to FIGS. 4 and 8, the locking member 200 has a lock groove for detachably mounting the first and second locks 302a and 302b therein. The lock groove has a pair of stoppers 201 for preventing the first and second locks 302a and 302b from being released out.

As illustrated in FIG. 4, the cover 40 has at least one mount groove 401 for mounting the button unit 301 and the locking module 300 therein. The mount groove 401 has guide holes 402 formed with a slope at a predetermined angle relative to the horizontal plane. The guide holes 402 guide the movement of sliding movement support members 301a which are formed on the button unit 301 and penetrate through the holes 402.

Figure 6:
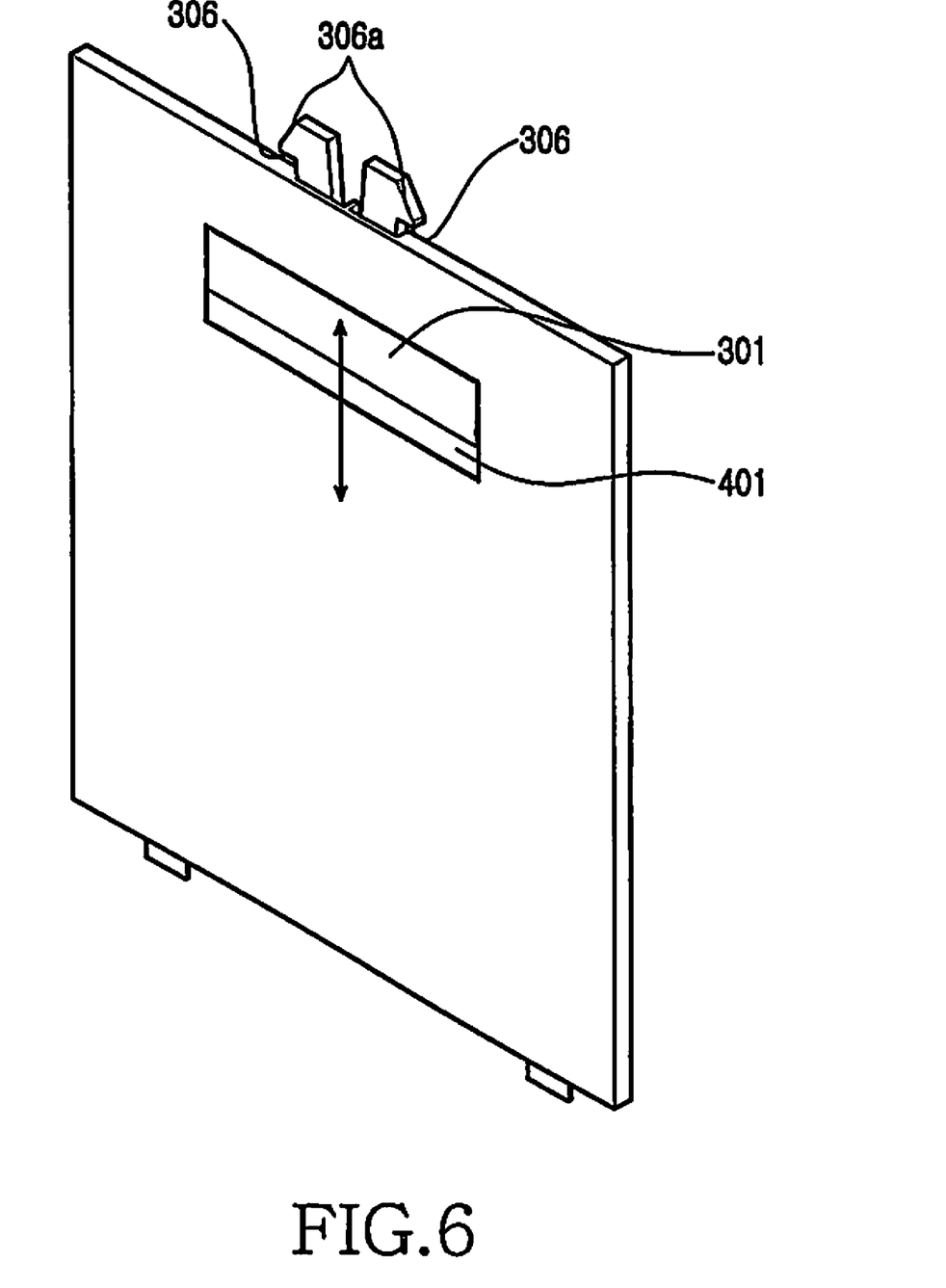
FIG. 6 is a perspective view of an internal battery pack cover of a mobile phone with a locking device coupled thereto according to the present invention.

Referring to FIGS. 4, 5 and 6, the locking module 300 consists of the button unit 301, a locking member 302 having a pair of locks 302a and 302b, and a hinge member 303. The button unit 301 is slidingly movable within the mount groove 401 formed on the cover 40. The locking member 302 is movably coupled to the button unit 301. The pair of locks 302a and 302b rotate around a hinge axis A1 with a sliding movement of the button unit 301. The button unit 301 penetrate through the cover 40 in order to be coupled to the locking member 302. The button unit 301 has at least one sliding movement support member 301a for supporting the sliding movement thereof.

Referring to FIGS. 4, 5, 7, 8, 9 and 10, the locking member 302 has first and second locks 302a and 302b, which are coupled in a X-shape or scissor-like fashion. The first and second locks 302a and 302 have projections 306 at the upper portions thereof. With the sliding movement of the button unit 301, the first and second locks 302a and 302b rotate around the hinge axis A1 in a direction to come together or separate from each other. At the same time, the projections 306 of the first and second locks 302a and 302b are released from or caught by the stoppers 201 of the locking member 200. A hinge hole 304 is formed at the intersection of the first and second locks 302a and 302b so that the hinge member 303 can be inserted therein. The first and second locks 302a and 302b have guide members 305 for guiding the movement of the sliding movement support members 301a of the button unit 301 at the lower portions thereof.

Figure 9:
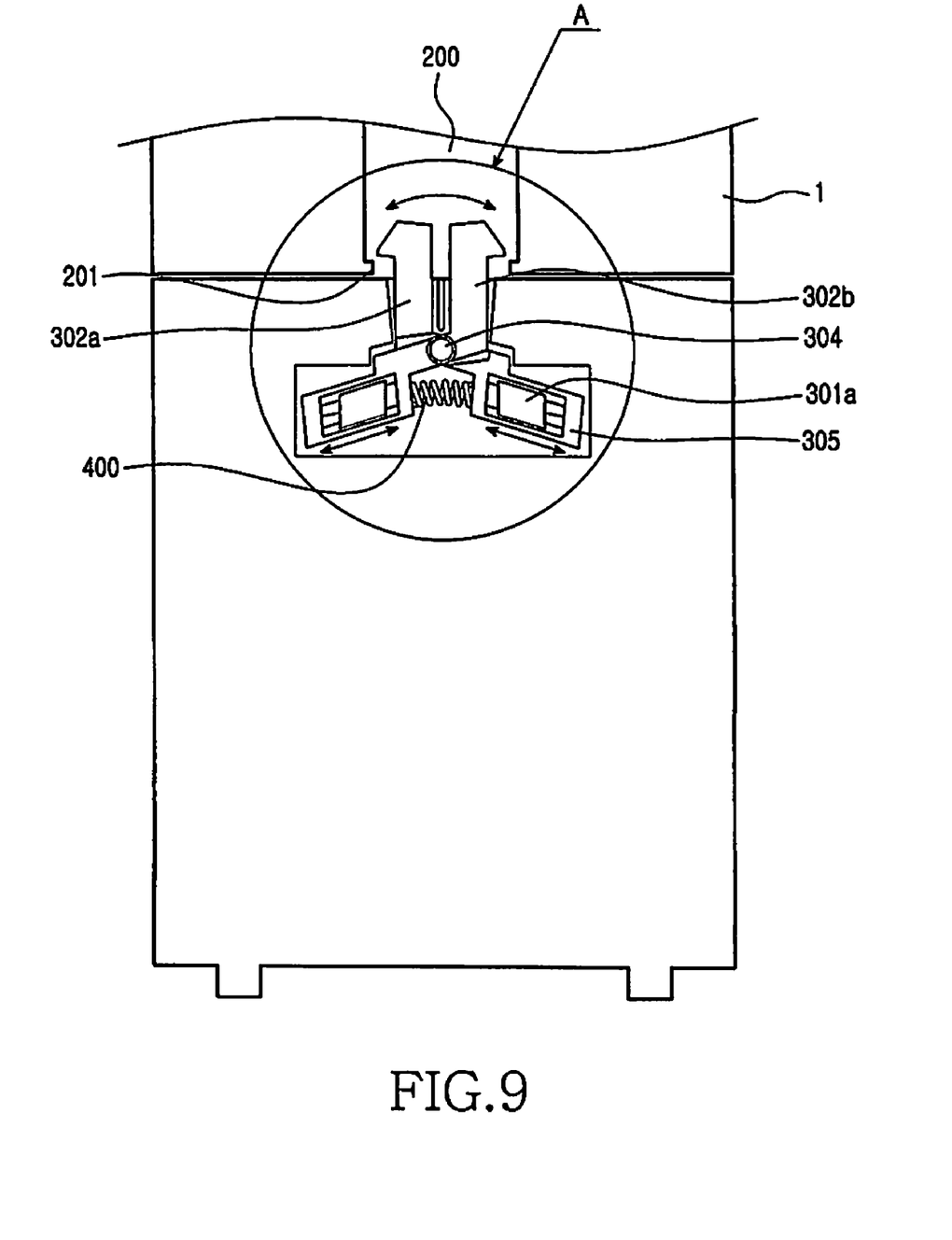
FIG. 9 is a rear view showing the operation of a locking device coupled to an internal battery pack cover of a mobile phone according to the present invention.
Figure 10:
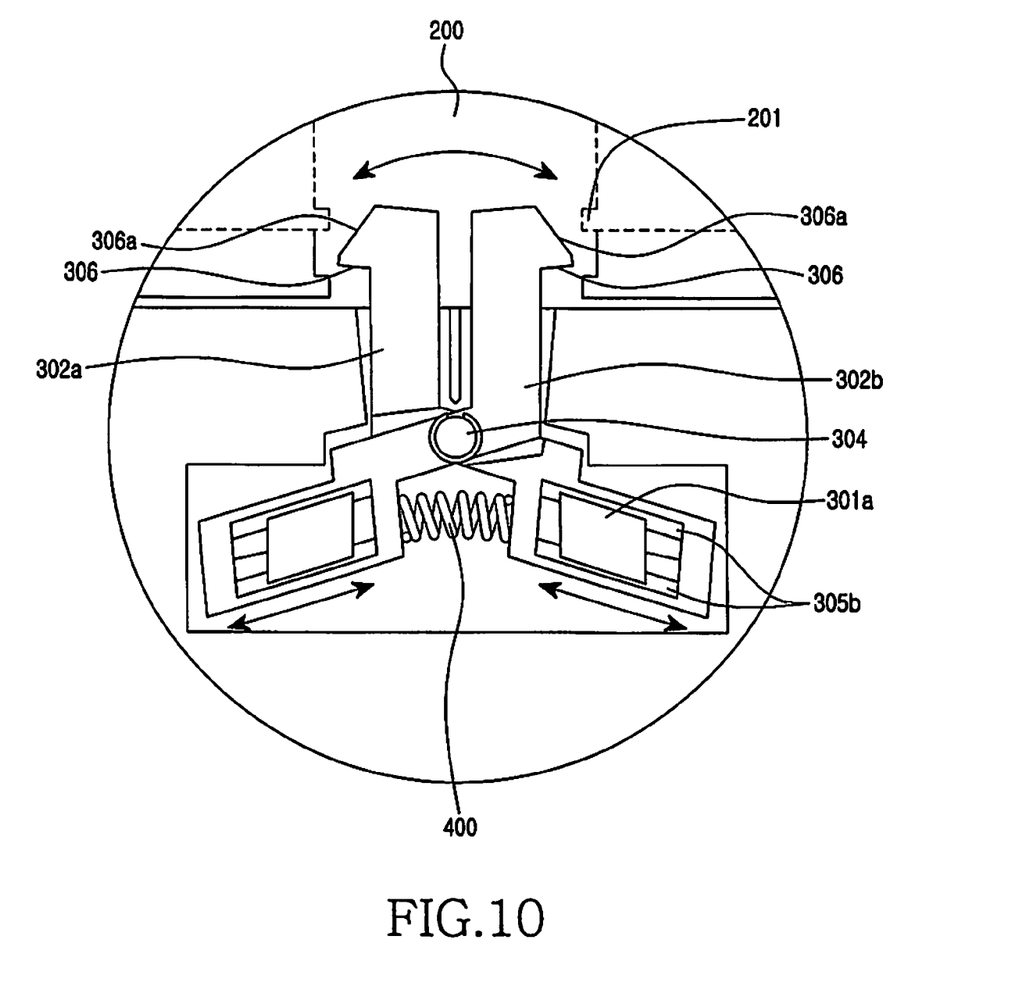
FIG. 10 is an enlarged rear view of part A of FIG. 9.

Referring to FIGS. 4, 9 and 10, an elastic member 400 is interposed between the lower parts of the first and second locks 302a and 302b in order to provide an elastic force for making the upper parts of the first and second locks 302a and 302b apart from each other. The first and second locks 302a and 302b are rotatably mounted on the mount groove 401 with the hinge member 303 inserted into the hinge hole 304. Then, an E-ring 500 is coupled to the hinge member 303 penetrating through the hinge hole 304 to support the first and second locks 302a and 302b.

As illustrated in FIG. 4, each guide member 305 consists of a guide movement hole 305a and a step-like stopper 306b. The sliding movement support members 301a of the button unit 301 penetrate through the guide movement holes 305a and are caught by the step-like stoppers 306b.

As illustrated in FIG. 5, the projections 306 have guide slopes 306a which facilitate the insertion of the projections 306 into the locking member 200 when the cover 40 is coupled to the lower case frame 1b of the main body 1.

The operation of the locking device having the above configuration for use in an internal battery pack cover of a mobile phone according to the present invention will be explained in further detail with reference to FIGS. 4 to 10.

Referring to FIGS. 4 and 5, the locking device 100 for an internal battery pack cover of a mobile phone according to the present invention includes the locking member 200 and the locking module 300. The locking module 300 has the first and second locks 302a and 302b which are coupled in a X-shape or scissor-like fashion.

The first and second locks 302a and 302b are rotatably mounted onto the mount groove 401. At this time, the hinge member 303 formed on the mount groove 401 is inserted into the hinge hole 304 formed at the intersection of the first and second locks 302a and 302b. Then, the E-ring 500 is coupled to the hinge member 303 protruded from the hinge hole 304.

Under this condition, the button unit 301 is slidably coupled to the outer side of the cover 40.

The button unit 301 has at least one sliding movement support member 301a. According to the present invention, two sliding movement support members 301a penetrate through the guide holes 402 formed on the mount groove 401 and are slidably coupled to the guide members 305 of the first and second locks 302a and 302b.

The guide members 305 each consist of a guide movement hole 305a and a step-like stopper 306b. The sliding movement support members 301a of the button unit 301 penetrate through the guide movement holes 305a and are caught by the step-like stoppers 306b.

The guide members 305 can guide the sliding movement of the sliding movement support members 301a.

Then, the cover 40 is mounted onto the main body 1 of the mobile phone as illustrated in FIGS. 5 and 6. At this time, the projections 306 formed at the upper ends of the first and second locks 302a and 302b are inserted into the locking member 200 of the lower case frame 1b of the main body 1.

Figure 7:
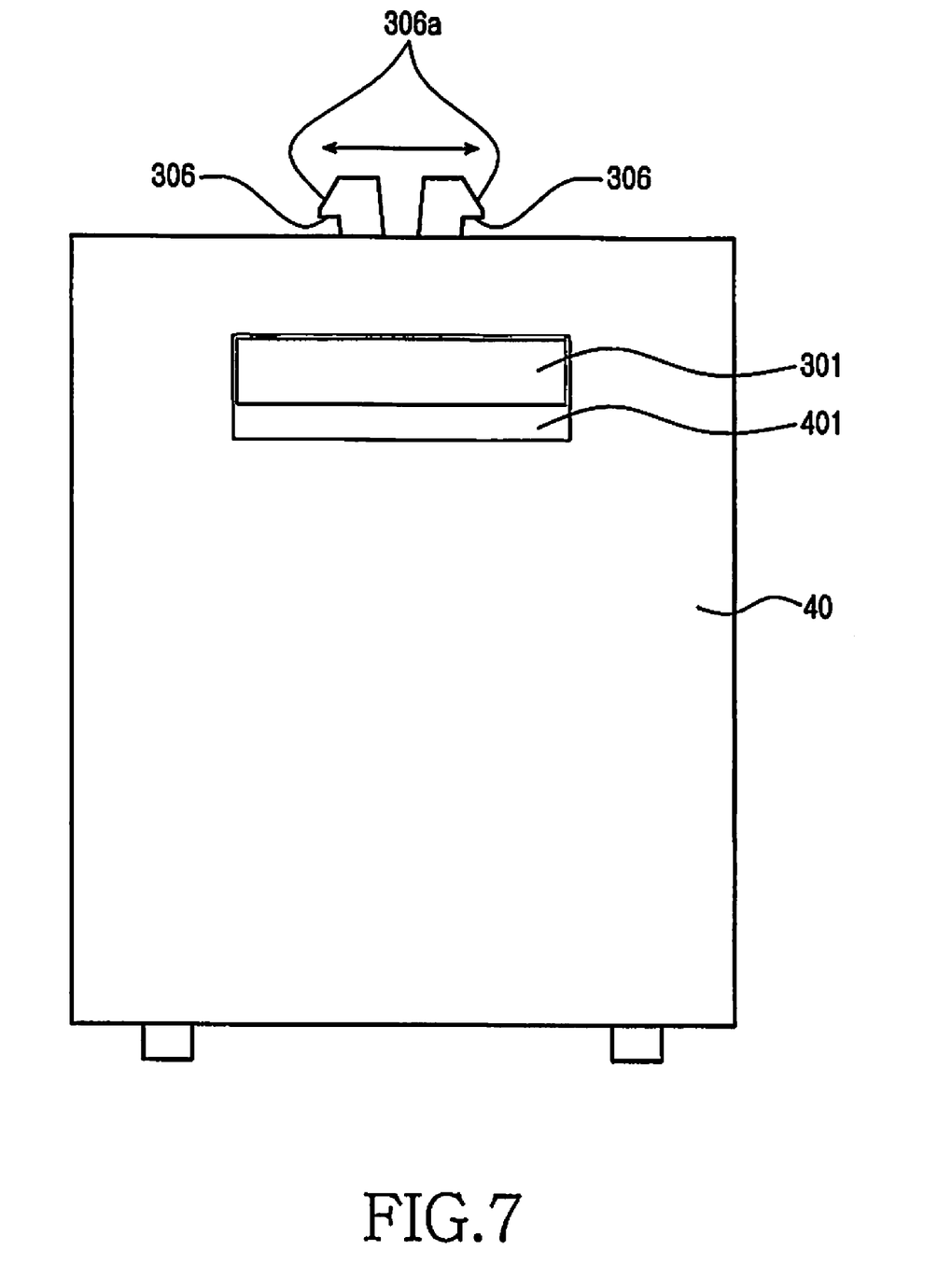
FIG. 7 is a front view of an internal battery pack cover of a mobile phone with a locking device coupled thereto according to the present invention.

As illustrated in FIGS. 7, 8 and 9, the projections 306 are caught by the stoppers 201 formed at the lower end of the locking member 200 are not to be released from the locking member 200. In order to separate the cover 40 of the battery pack 10 from the main body 1, the user should first slidingly move the button unit 301 downward. With the movement of the button unit 301, the sliding movement support members 301a also moves along the guide holes 402 formed on the cover 40 and along the guide members 305 of the first and second locks 302a and 302b.

The guide holes 402 and the guide members 305 have a slope at a predetermined angle to support the inclined movement of the sliding movement support members 301a.

As illustrated in FIGS. 9 and 10, the first and second locks 302a and 302b rotate around the hinge axis A1 of the hinge member 303 in a direction to get closer to each other. At this time, the projections 306 formed at the upper ends of the first and second locks 302a and 302b become closer to each other and thereby become released from the locking member 200 of the lower case frame 1b. Thus, the user can remove the cover 40 from the main body 1 and remove the battery pack 10.

Due to the elastic member 400 interposed between the lower parts of the first and second locks 302a and 302b, the first and second locks 302a and 302b are forced apart and return to their original positions.

In order to couple the cover 40 again to the lower case frame 1b of the main body 1 as illustrated in FIG. 8, the user should first insert the locking module 300 of the cover 40 into the locking member 200. The projections 306 of the first and second locks 302a and 302b are inserted into the locking member 200 with their sloping surfaces being in contact with the stoppers 201. Once inserted, the projections 306 are caught by the stoppers 201 to be kept within the locking member 200.

The projections 306 have guide slopes which guide and facilitate the insertion of the projections 306 into the locking member 200.

As described above, the present invention provide a locking device for detaching a cover of an internal battery pack from a main body of a mobile phone by a sliding movement of a button unit and the resulting rotation of locks. The locking device according to the present invention can reduce the space required for mounting a conventional locking device for an internal battery pack cover and improve appearance of a mobile phone.

Although preferred embodiments of the present invention have been described for illustrative purposes, those skilled in the art will appreciate that various modifications, additions and substitutions are possible, without departing from the scope and spirit of the invention as defined by the appended claims, including the full scope of equivalents thereof.

What is claimed is:

1. A locking device for an internal battery pack cover of a mobile phone, which is mounted on a lower case frame of a main body of the mobile phone, comprising:
a locking member formed on the lower case frame; and
a locking module coupled to the cover and comprising a button unit coupled to the cover and a pair of locks rotatable around a hinge axis for mounting within or releasing from the locking member, thereby causing the cover to be coupled to or detached from the main body, wherein the button unit comprises sliding movement support members that penetrate through at guide holes of the cover, and wherein the pair of locks comprise guide members that receive the sliding movement support members and translate a linear sliding movement of the button unit in a direction perpendicular to the hinge axis into a rotation of the pair of locks.

2. The locking device according to claim 1, wherein said locking member has a lock groove for detachably mounting the locking module therein and a pair of stoppers for preventing the locking module from being released from the lock groove.

3. The locking device according to claim 1, wherein said cover has at least one mount groove for mounting the button unit and the locking module therein and the pair of guide holes are formed on the mount groove with a slope at a predetermined angle relative to the horizontal plane, said guide holes for guiding the inclined movement of the sliding movement support members.

4. The locking device according to claim 3, wherein said locking module includes:
a hinge member mounted on the mount groove to provide the hinge axis and to rotatably couple the locks thereto.

5. The locking device according to claim 4, wherein said locks are first and second locks which are coupled in one of a X-shape and scissor-like fashion.

6. The locking device according to claim 5, wherein said first and second locks have:
projections formed at the upper parts thereof to rotate around the hinge axis in a direction to get closer to or apart from each other and thereby to be released from or caught by the stoppers of the lock member with a sliding movement of the button unit; and
a hinge hole formed at the intersection thereof to allow the hinge member to penetrate;
wherein the guide members are formed at lower parts thereof to guide the movement of the sliding movement support members of the button unit.

7. The locking device according to claim 6, wherein said guide members are formed with a slope at a predetermined angle to guide the inclined movement of the sliding movement support members.

8. The locking device according to claim 6, wherein said guide members include guide movement holes, through which the sliding movement support members penetrate, and step-like stoppers for holding the sliding movement support members penetrating through the guide movement holes.

9. The locking device according to claim 6, wherein said projections have guide slopes for guiding the insertion of the projections into the lock member.

10. The locking device according to claim 5, wherein said locking module further includes an elastic member interposed between the lower parts of the first and second locks to provide an elastic force for making the upper parts of the first and second locks apart from each other.

11. The locking device according to claim 5, wherein said locking module further includes an E-ring coupled to the hinge member which penetrates through the hinge hole when the first and second locks are rotatably mounted on the mount groove.

12. A locking device for an internal battery pack cover of a mobile phone, which is mounted on a lower case frame of a main body of the mobile phone, comprising a locking module comprising a button unit coupled to the cover and a pair of locks that is rotatable around a hinge axis for mounting within or releasing from the frame, thereby causing the cover to be coupled to or detached from the main body, wherein the button unit comprises sliding movement support members that penetrate through at guide holes of the cover, and wherein the pair of locks comprise guide members that receive the sliding movement support members and translate a linear sliding movement of the button unit in a direction perpendicular to the hinge axis into a rotation of the pair of locks.

* * * * *